April 11, 1967     D. SPENCER     3,313,447
ANTI-SPLASH GUARD FOR DRINKING RECEPTACLE
Filed Oct. 19, 1965
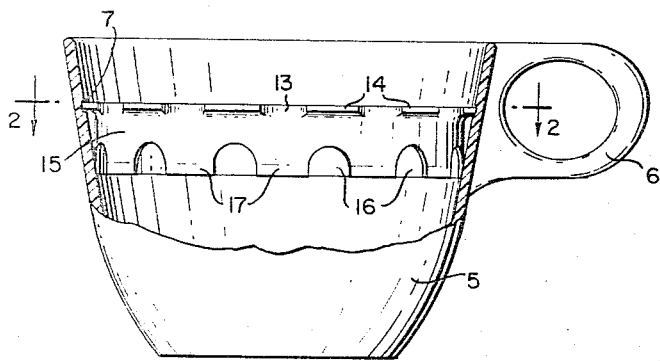
FIG__1
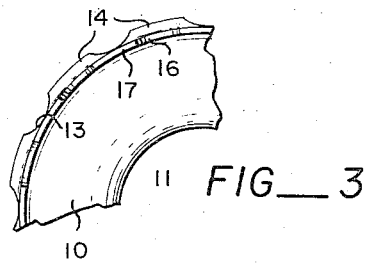
FIG__3
FIG__2
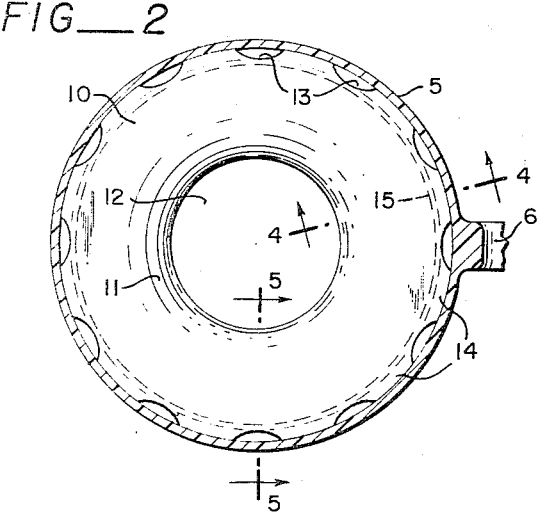
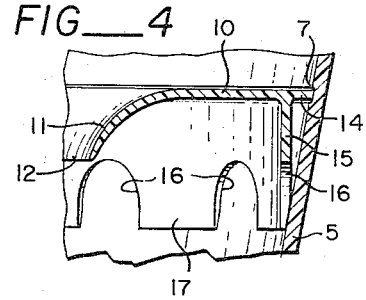
FIG__4
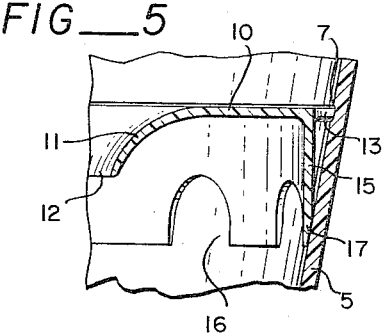
FIG__5
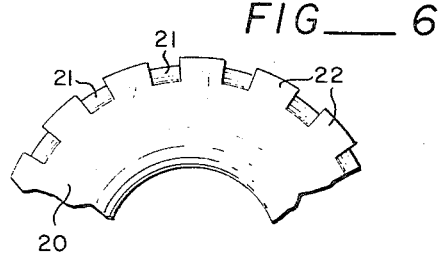
FIG__6
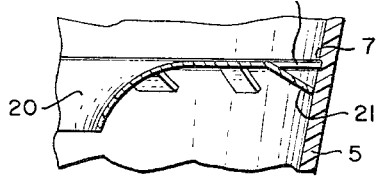
FIG__7
DEAN SPENCER
INVENTOR.
BY *Saul & Berry*
ATTORNEYS

United States Patent Office 3,313,447
Patented Apr. 11, 1967

3,313,447
ANTI-SPLASH GUARD FOR DRINKING RECEPTACLE
Dean Spencer, Seattle, Wash.
(23615 Marine View Drive, Des Moines, Wash. 98016)
Filed Oct. 19, 1965, Ser. No. 497,890
7 Claims. (Cl. 220—90.4)

This invention relates to a guard device for use with a cup, glass or other like or suitable drink-containing receptacle to prevent the contained liquid from spilling should the receptacle be subjected to the type of uncontrolled motion which can be expected on an airplane, ship, or other moving vehicle.

One object of the invention is to provide a device for this purpose which can be easily inserted to and removed from the receptacle and which can be produced at such an inexpensive figure that the same can be marketed as a "throwaway" item, i.e. one to be discarded after use.

Another object is to provide a device which performs its intended spill-proofing function with unusual efficiency and yet neither materially dampens the volume of flow, so as to hamper a user's consumption of the contents of the drinking receptacle, nor requires that the receptacle be held in any manner or position different from that to which the general public is accustomed.

The invention has the further object of providing a spill-proofing device which allows a drinking receptacle to be either filled or re-filled while the device remains in place within the receptacle.

These and yet additional objects and advantages of the invention will appear and be understood in the course of the following description and claims, the invention consisting in the novel construction and in the adaptation and combination of parts hereinafter described and claimed.

In the accompanying drawing:

FIGURE 1 is a transverse vertical sectional view illustrating a preferred embodiment of the present invention, shown in operating position within a cup.

FIG. 2 is a top plan view thereof.

FIG. 3 is a fragmentary underside plan view of the "throw-away" device, shown removed from the cup.

FIGS. 4 and 5 are fragmentary transverse vertical sectional views drawn to an enlarged scale on lines 4—4 and 5—5, respectively, of FIG. 2.

FIG. 6 is a fragmentary top plan view of a modified form of the invention; and

FIG. 7 is a transverse vertical sectional view thereof, shown in its operating association with a cup.

Referring to said drawing, the numeral 5 denotes a drinking receptacle which I have here illustrated as comprising a cup having a handle 6. The inner wall of the cup is desirably formed with a circumferential groove 7 spaced a moderate distance below the rim of the cup. It is intended that the cup be filled to a level somewhat below the groove. The groove is quite shallow. An insertable annular disc is adapted to be snapped into said groove, thus to facilitate a placement of the disc within the cup so that the same snugly fits the cup in a prescribed position parallel with the upper edge of the cup.

In the preferred embodiment the disc is formed from plastic. While I have shown the same as having a fairly thick wall this is only for clarity in illustration in that materials suitable for the purpose—polypropylene for example—can be injection-molded and provide suitable rigidity with little more than paper thickness.

The disc provides a head wall 10 which is curled downwardly, as at 11, about a center opening 12, and has notches 13 let into the perimeter at closely spaced equidistant intervals of the circumference to give the periphery a serrated appearance. The teeth 14 which lie between the notches are blunt-edged with a width—measured along the circumference—preferably equal to or greater than the span across the notches. The notches have or may have an arcuate shape.

The disc has a cylindrical skirt 15 depending as a flange from the underside of the head wall. This skirt is concentric to the disc's outer perimeter and is spaced inwardly therefrom. The skirt is serrated along its bottom edge by comparatively deep notches 16 corresponding in number to the number of teeth 14. Each notch 16 is centered relative to a respective radius of the disc which bisects a related said tooth. The span across the notches 16 is no greater than the width of the teeth 14 and is by preference moderately less. The serrations of the skirt, and namely the teeth 17 which lie between the notches 16, have linear lower edges which occupy a common plane paralleling the plane occupied by the teeth 14.

When the disc is inserted in the cup the horizontal teeth 14 snap into the groove 7. The skirt is so dimensioned that when the teeth 14 occupy said position the linear lower edges of the vertical teeth 17 are brought into approximate bearing engagement with the sloping wall of the cup below said groove. The inner face of this sloping wall, the vertical outer faces of the teeth 17, and the horizontal bottom faces of the teeth 14 collectively produce a mixing chamber, triangular in cross-section, ringing the skirt. The notches 16 serve as ingress openings to this space, and the notches 13 as egress openings, and in order for liquid within the cup to flow through this space to the lip of the cup the liquid must travel a path of alterations. As the cup is tilted multiple streams enter the mixing chamber through a plurality of the ingress openings. Gravity flow dictates that these entering streams first move endwise to the axis of the receptacle. The teeth 14 serve as baffles to interrupt the flow. Each stream breaks up and issues from the egress openings only after impinging—with consequent eradication of any flow pattern—with liquid from the next adjacent streams. Regardless of any shaking to which the receptacle may be subjected, the intermingled streams which issue from the mixing chamber are substantially devoid of any velocity.

In a modified version of the invention which I illustrate in FIGS. 6 and 7, an annular disc 20 is produced in a punch press from a flat piece of relatively stiff material. Thin sheet metal or waxed paper are examples of a material suitable for the purpose. An even number of closely spaced radial slits are produced, and each of the alternate flaps 21 which this slitting produces are deflected downwardly to an angle of, say 20° from the plane of the disc. The intervening flaps 22 may but need not be deflected upwardly. A result quite comparable to that of my preferred embodiment is obtained.

While not illustrated it will be apparent that a functioning structure could be provided by so designing the receptacle and the disc that the baffled flow passages would be formed in part by the receptacle and in part by the disc. Disadvantages would be an increase in the cost of the receptacle, and difficulty in cleaning.

It is believed that the invention will have been clearly understood from the foregoing detailed description of my now-preferred illusrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination with a circular receptacle open at the top and used for drinking a liquid contained in the receptacle, a disc fitting in said open end of the receptacle, the disc being formed so as to produce a multiplicity of flow passages distributed in closely spaced relation within an area located between the inner wall of the receptacle and a circle which is spaced a moderate distance inwardly therefrom and has the axis of the receptacle as its center and with the flow passages characterized in that liquid is caused in the course of its traversal of any one passage to intermingle with liquid from a next adjacent passage.

2. Structure as claimed in claim 1 in which the disc provides a head wall which bears by its outer edge against the interior wall of the receptacle and has a concentric flange which depends from the head wall and is spaced inwardly from said bearing edge of the latter, the portion of the head wall between said bearing edge and the flange providing an overhanging lip portion, said flange, the overhanging lip portion of the head wall, and the interior wall of the receptacle defining an annular channel which is common to all of the flow passages, said intermingling of liquid occurring in said annular channel.

3. Structure as claimed in claim 2 in which said lip portion of the head wall and said flange each have openings therein the latter leading to and the former leading from said annular channel.

4. Structure as claimed in claim 2 in which admission openings for the flow passages are formed in the flange, the lip portion of the head wall being notched about its perimeter to produce teeth which define emission openings for the flow passages and give the disc a serrated appearance, plan view considered, each of the teeth which are produced being centered in relation to a respective one of the admission openings, the outer rims of said teeth being concentric to the center of the disc and having a span greater than the width of admission openings.

5. Structure as claimed in claim 1 in which the interior wall of the receptacle is circumferentially grooved and wherein the disc is composed of a thin-walled springy material notched about the periphery to give the same a serrated appearance and provide teeth which snap into the groove, the notches serving as emission openings for the flow passages.

6. Structure as claimed in claim 5 in which the teeth are provided in the perimeter of a head wall portion of the disc, the disc having a flange which depends from the head wall in inwardly spaced concentric relation to said perimeter, the lower edge of the flange being in approximate bearing contact with the interior wall of the receptacle and having notches in said lower edge to provide admission openings for the flow passages.

7. In combination with a circular receptacle open at the top and used for drinking a liquid contained in the receptacle, a disc fitting in said open end of the receptacle, the disc being formed so as to produce a multiplicity of flow passages closely spaced about the circumference of a circle having the axis of the receptacle as its center and a radius moderately less than the radius of the receptacle and each including within its length a baffle dictating that liquid traversing the passage travel a path of alterations, the passages being so formed that liquid traversing any one passage is caused to impinge against and intermingle with liquid from a next adjacent passage.

References Cited by the Examiner

UNITED STATES PATENTS

| | | | |
|---|---|---|---|
| 562,440 | 6/1896 | Vandersall | 220—90.2 |
| 1,739,627 | 12/1929 | Austin | 220—90.4 |
| 2,529,114 | 11/1950 | Tellier | 220—90.4 |
| 2,761,301 | 9/1956 | Tellier | 220—90.4 |

JOSEPH R. LECLAIR, *Primary Examiner.*

D. F. NORTON, *Assistant Examiner.*